Oct. 25, 1966 A. W. JOY 3,281,821
ELECTRIC VISUAL BIDDER SYSTEM HAVING INTERLOCK
CIRCUITRY CONNECTING THE BIDDING STATIONS
Filed Dec. 12, 1962 3 Sheets-Sheet 1

Ardo W. Joy
INVENTOR.

BY Clarence A. O'Brien
and Harvey B. Jacobson
Attorneys

Ardo W. Joy
INVENTOR.

BY Clarence A. O'Brien
and Harvey B. Jacobson
Attorneys

Ardo W. Joy
INVENTOR.
BY Clarence A. O'Brien
and Harvey B. Jacobson
Attorneys

United States Patent Office 3,281,821
Patented Oct. 25, 1966

3,281,821

ELECTRIC VISUAL BIDDER SYSTEM HAVING INTERLOCK CIRCUITRY CONNECTING THE BIDDING STATIONS

Ardo W. Joy, Indianapolis, Ind.; Helen H. Joy, executrix of said Ardo W. Joy, deceased, assignor to Helen Hiatt Joy, Indianapolis, Ind.

Filed Dec. 12, 1962, Ser. No. 244,174
19 Claims. (Cl. 340—324)

This invention relates to a system for conducting an auction in a more efficient, and ethical manner. The system is particularly useful in connection with livestock auctions although not necessarily restricted thereto.

It is therefore a primary object of the present invention to provide an arrangement of apparatus whereby the sale of commodities may be conducted by auction procedure to an assembly of prospective purchasers, thereby eliminating unfair practices in which one or more purchasers and/or the auctioneer may engage in.

In connection with the auctioning of livestock as one example to which the present system is applicable, the assembled purchasers enter their bids by responding to the auctioneer's request for an incremental increase in the previous buyer's bid, the first purchaser to so respond then becoming the highest bidder. When no further response is received to the next request of the auctioneer for a further incremental increase in the bid, the bidding is terminated for the particular item being auctioned thus completing sale of this item to the last and final bidder. The response of a bidder to the auctioneer's request may take various forms such as a nod of the head, a flick of the finger, a wink of the eye, or a spoken word. The faults and shortcomings of the bidding method referred to as hereinbefore practiced, are many including the lack of precision in communication between the auctioneer and the bidders as well as the many opportunities available for unfair practices as hereinbefore indicated. As will be appreciated by those attending auctions, the selling procedures are fast, noisy and confusing because of the auctioneer's chant and the manner in which the purchasers bid. It is therefore often very difficult for legitimate purchasers to rely on their own judgment as to the quality, condition and value of the commodities being sold and also these buyers may be victim of the various "tricks" and unfair practices that sometimes characterize the auctions. For example, regular buyers at an auction by collusion may deliberately increase the price of an item being auctioned so as to discourage new buyers from entering the market. Thus, the open identity of the bidder to the remaining purchasers, may often constitute a drawback to the present bidding procedures. It is also known, that major, purchasers at auction markets because of the unfair advantage they may have acquired in connection with the auctioning procedures, will make purchases for new buyers for a fee and thereby be able to rig the auctioning. Also, occasional or seasonal buyers unable to afford bidding against dominant buyers attending auctions, find it cheaper to pay a fee to such dominant bidders rather than having them artificially increase the bidding price. It will therefore become apparent, that another important object of the present invention is to eliminate identification of the bidders until the final bid is in and accepted.

By eliminating the identification of the bidder, the system of the present invention also eliminates to a large degree, an unfair practice wherein a dealer may bid on his own item in an effort to artificially raise the price thereof.

The system of the present invention also prevents unfair practices on the part of the auctioneer whereby the auctioneer may often increase the tempo of the sale so as to confuse the bidders and make the sale to a favored buyer. Thus, by eliminating the identity of the bidder, the foregoing unfair practice on the part of the auctioneer is prevented. Furthermore, the visual bidding display arrangement of the present system would replace the noisy and confusing atmosphere of the auction so as to endow it with more dignity and respect and thereby establish confidence in the auction selling of commodities. It is therefore a further object of the present invention to provide an arrangement whereby the incremental bids as well as the partial totals are displayed and wherein each purchaser may enter a bid in response to the auctioneer's requests in a silent manner with acceptance of the bid being out of the control of the auctioneer.

In accordance with the foregoing objects, the bidding system of the present invention involves the installation of a plurality of signal emitting devices located at bidding stations from which a prospective purchaser may enter a bid. The auctioneer's roll is therefore relegated to requesting bids involving preselected incremental increase in the previous bid. Preselection of the incremental increase is made by actuation of keys on the keyboard of an adding machine which is connected into the system, in accordance with the auctioneer's judgement to control the speed of and stimulate interest in the auction sale. The current incremental amount is displayed and a cumulative total recorded and displayed upon receipt of signals which are out of the control of the auctioneer but under the control of the first bidders to respond to request for bids by actuation of signal emitting devices. Accordingly, the signal emitting devices are so arranged and operatively interconnected so that actuation of one of them will render the others inoperative until the next bid is made available after recording and displaying the current total through the adding machine. When no further bids are received by the auctioneer, selective actuation of a clearing control will be operative to register the total or the last highest bid and at the same time identify the origin of the bid. Also associated with and connected to the adding machine, will be one or more display boards on which the current increment and partial sum are displayed. The auctioneer will also have available a reset control whereby the adding machine may be restored to its initial operative condition and all of the signal emitting devices at the bidding stations rendered operative in order to begin the bidding on a new item. Also located at each of the bidding stations, will be an indicator whereby the buyer may be appraised of the fact that he is still the last bidder. Also, each of the signal emitting devices will be associated with an interlock whereby the signal emitting device cannot again be actuated and will hold all of the other signal emitting devices inoperative to dispatch a bidding signal until bidding is called for by the auctioneer and a bidding signal dispatched in response thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
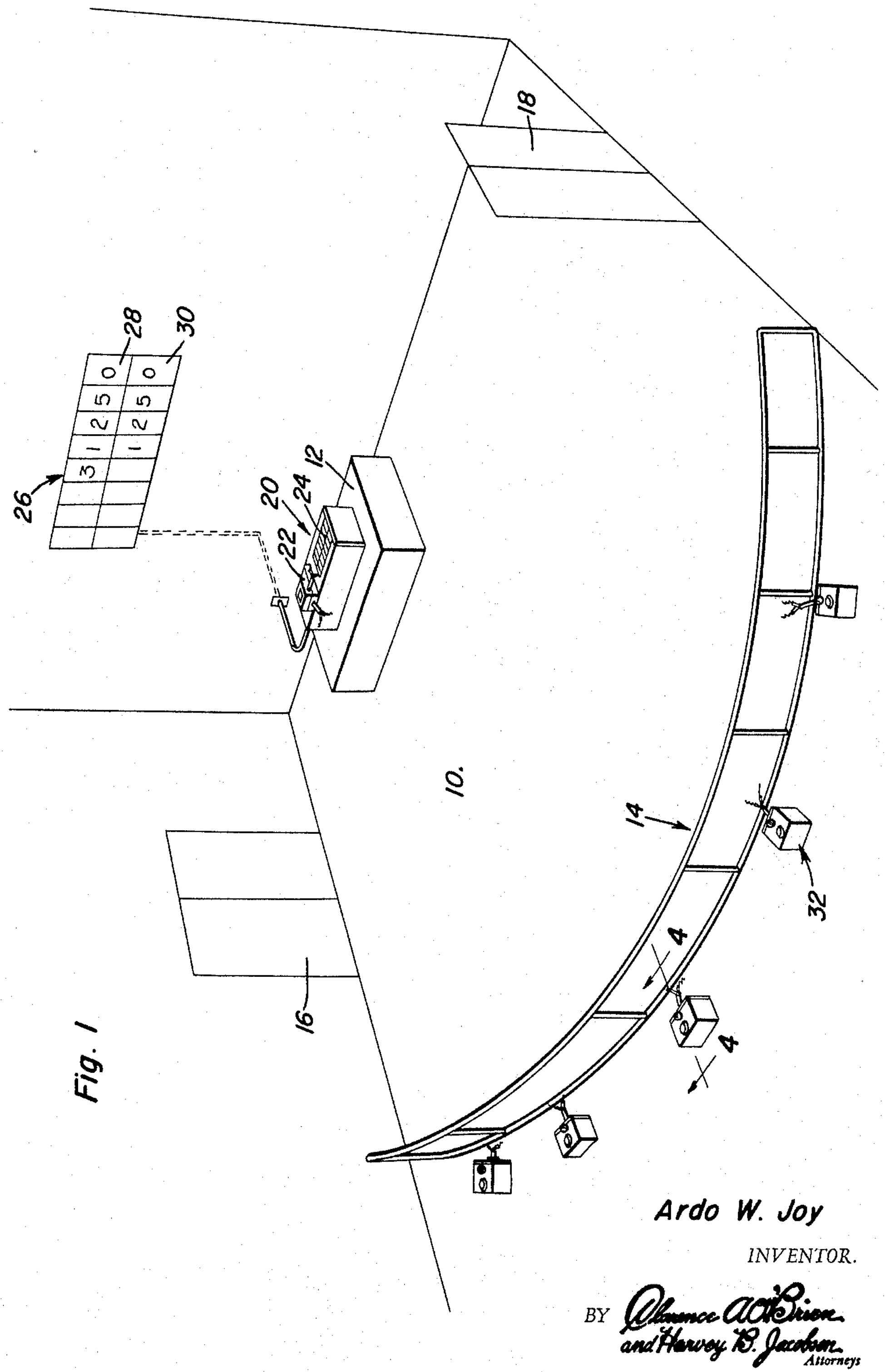
FIGURE 1 is a perspective view of a typical arrangement of components whereby the system of the present invention may be practiced in connection with a livestock auction.

Referring now to the drawings in detail, it will be observed from FIGURE 1, that a livestock auction may be conducted within a sheltered area or any suitable location within which there is defined a livestock arena 10 between an auction block 12 and a fence 14. Livestock may therefore be displayed within the arena 10, entering the gate 16 and leaving through the gate 18. The auctioneer will therefore be located on the auction block 12 and have available the facilities at the control station 20 including the keyboard of an adding machine 22 and a personal display board 24 displaying information simultaneously with the information displayed on the large visual display board 26 centrally located behind the control station for viewing by the prospective buyers and bidders located behind the fence 14. The display board 26 will therefore be provided with an upper row 28 bearing the partial sum or current highest bid for the item being auctioned. The lower row 30 will display an incremental amount selected by the auctioneer by depression of the proper key on the keyboard of the adding machine for which the response of a bidder is being sought so as to increase the total appearing on the upper row 28. The first bidder to so respond by dispatch of a signal from one of the bidding stations 32, will accordingly increase the total appearing on the upper row 28 of the display board. The auctioneer may then request another bid increase by the same incremental amount or a different incremental amount effected by depression of another key of the adding machine which would then appear on the lower row 30 of the display board. After the current total appears on the upper row, signals may be dispatched from any one of the bidding stations except the station from which the previous bid originated, this previous bidding station not being identified however in any manner to the other bidders or the auctioneer. However, the previous bidder will know when his bid has been cancelled by the next bid and will thereafter be able to again dispatch a bidding signal.

Figure 2:
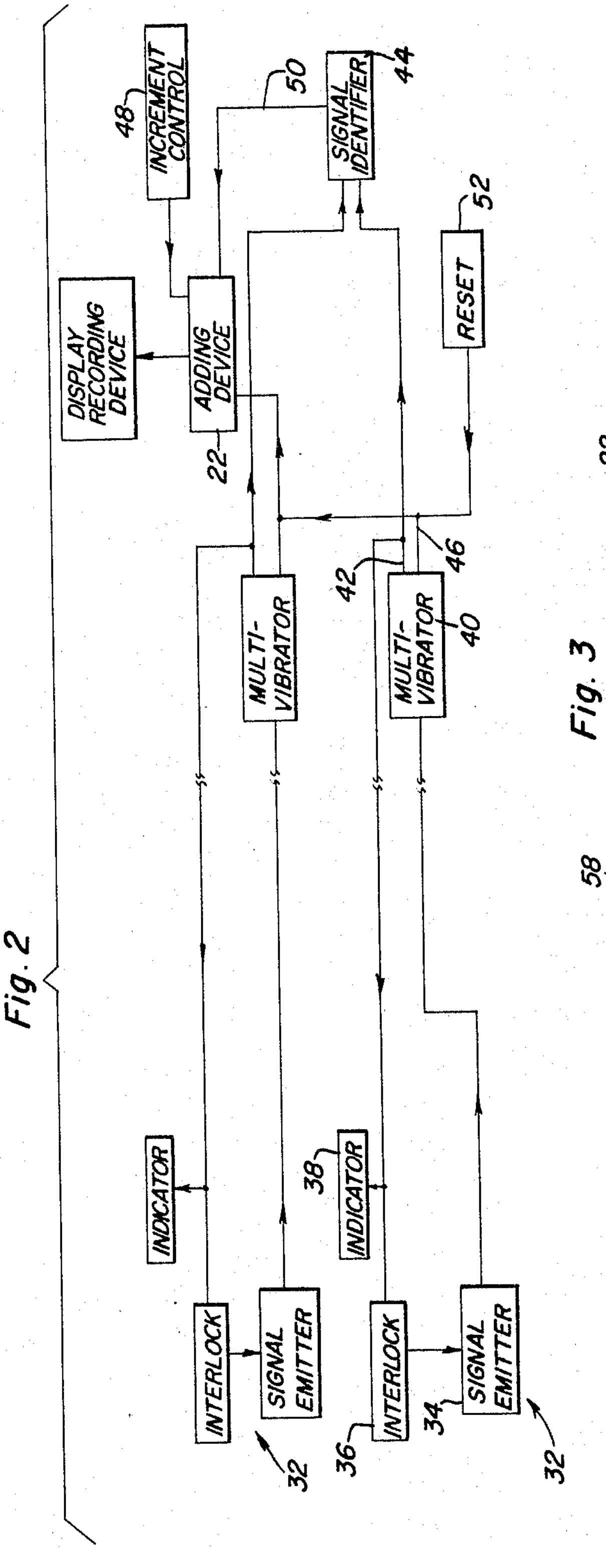
FIGURE 2 is a flow diagram illustrating the system of the present invention.

Referring now to FIGURE 2 in particular, it will be observed that located at each bidding station 32, is a signal emitting device 34 having associated therewith an interlock device 36 and an indicator device 38. This signal emitter 34 is associated with a signal transmission disabling component in the form of multi-vibrator switching devices 40 located at the control station 20. Upon dispatch of a signal from the signal emitter 34 through signal lines 56, the multi-vibrator 40 may be switched to one of two stable conditions so as to produce an output in line 42 operative to energize the indicator 38 and through the interlock 36, operative to hold the signal emitter in its actuated position. The output from the multi-vibrator through the line 42 will also be connected to the signal identifying device 44 which is operative to identify the origin of the bidding signal should this be the last or final bid. It will also be observed, that all of the second outputs 46 from the multi-vibrators 40 are interconnected to each other and to the adding device 22. Accordingly, each time one of the multi-vibrators 40 is switched to the condition in which an output is produced from the line 42, a pulse will be produced for actuating the adding device and also to prevent any of the other multi-vibrators from being switched to that condition to which the first actuated multi-vibrator has been switched by its associated signal emitter. The information thus obtained and registered by the adding device 22 will be displayed and recorded by the display boards 24 and 26 and the tape associated with the adding machine 22. After being so displayed and recorded, the auctioneer may request another bid at the same incremental increase or selectively actuate the incremental control 48 before receipt of another bidding signal. When the last bid is in, that is no further bid has been received, actuation of the signal identifying device 44 by the auctioneer or his clerk handling the adding machine controls, will be operative to clear the adding device 22 and register by code number or letter the bidding station from which the last bidding signal originated. Accordingly, the signal identifier 44 is connected by the line 50 to the adding device for clearing and bidder identification purposes. In order to initiate a new sale, the auctioneer is also provided at the control station 20, with a reset device 52 operatively connected to the multi-vibrators and arranged thereby to bias all of the multi-vibrator devices to that stable condition wherein they may be switched to the other stable condition by its associated signal emitter.

Figure 3:
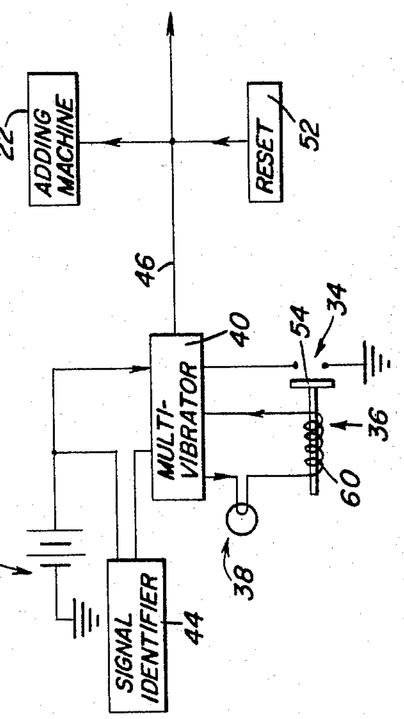
FIGURE 3 is a simplified circuit diagram of a portion of the system.

Referring now to FIGURE 3 in particular, it will be observed that the signal emitter 34 may be in the form of a grounding switch 54 adapted to be closed at the bidding station by a prospective buyer for the purpose of dispatching a bidding signal. The bidding signal may thereby be conducted by conductor 70 establishing a grounding circuit in the multi-vibrator 40 associated therewith so as to cause switching of the multi-vibrator from a condition in which current flows from the voltage source 58 to the output line 46 connected to the adding machine 22 as well as to the other multi-vibrators. Closing of the switch 54 will therefore be operative to interrupt the condution of current to the line 46 and instead produce a flow of energizing current from the voltage source 58 through a relay device within the signal identifier 44 and the indicator lamp 38 connected in series with a magnetic holding coil 60 operative to hold the switch 54 in its closed position in order to maintain the energizing circuit for the indicator lamp 38 and the relay associated with the signal identifier. The condition in which the multi-vibrator 40 is so held, will be operative through the output line 46 to prevent any similar switching in the other multi-vibrators to which the line 46 is connected in order to disable transmission of signals from the other signal emitting devices. It will also be appreciated, that when the line 46 is switched from its conducting condition to its non-conducting condition, a signal pulse is produced within the adding machine 22 operative to register a new total representing the highest bid. If this is the final bid, actuation of the signal identifier 44 as hereinbefore indicated, will be operative to record the origin of the bidding signal as well as the final total. This same operation will clear the adding machine so that upon actuation of the reset device 52, the machine 22 and all of the multi-vibrators may be reset to their initially operative condition.

Figure 4:
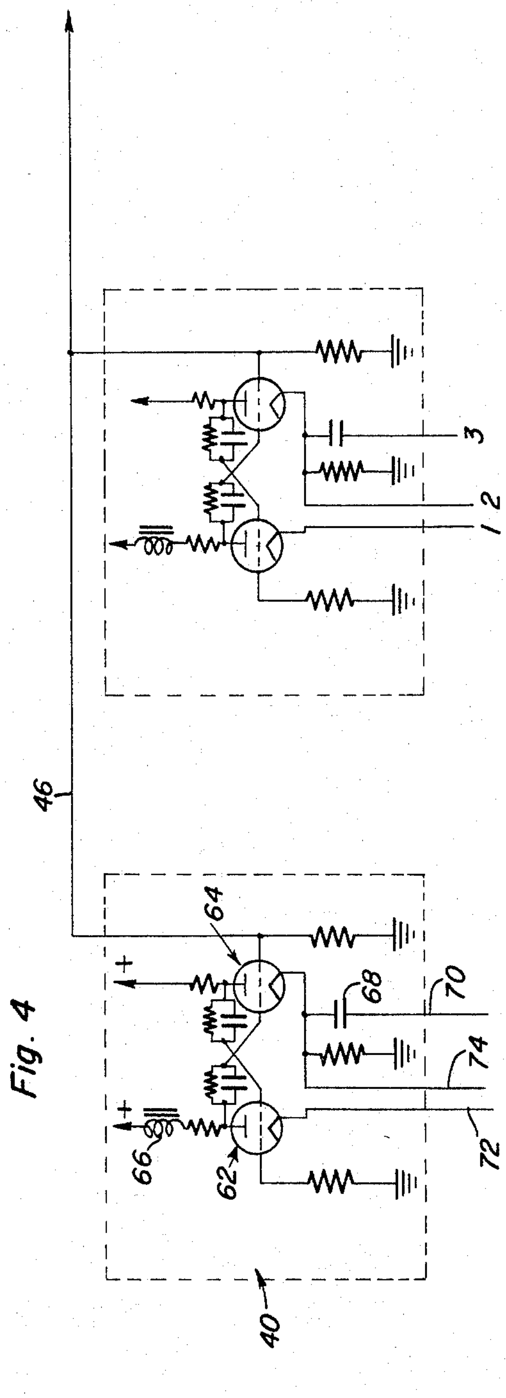
FIGURE 4 is a circuit diagram of a pair of interconnected multi-vibrator devices associated with the system of the present invention.

Referring now to FIGURE 4, it will be observed that each of the multi-vibrators 40 includes a pair of current conducting devices in the form of triodes 62 and 64. The grids of each of the triodes are interconnected to the plates of the other triodes by resistive-capacitive impedances and are also respectively maintained above ground potential through resistors. A biasing voltage is applied through a biasing resistor to the plate of the triode 64 while the output line 46 is connected to the grid thereof. A biasing voltage is also applied through a biasing resistor to the plate of the triode 62, the biasing resistor being connected in series with a pickup relay coil 66 associated with the signal identifying device 44. Accordingly, the positive potential being applied to the plate of the triodes 62 and 64 will normally bias the multi-vibrator to a stable condition in which the triode 64 is conductive and the triode 62 non-conductive. In order to switch the multi-vibrator to its other stable condition, the cathode of the triode 64 is shunted to ground through a coupling capacitor 68 and the line 70. Accordingly, grounding of the line 70 is effected through the signal emitter 34 associated with the multi-vibrator. When this occurs, the triode 64 is rendered non-conductive so that the line 46 connected to the grids of the triodes 64 of the other multi-vibrators will prevent these other multi-vibrators from being switched. The triode 62 which was rendered conductive will therefore complete a circuit between the lines 72 and 74. The lines 72 and 74 as well as the line 70 is therefore connected to the bidding station with which the multi-vibrator is associated.

Figure 5:
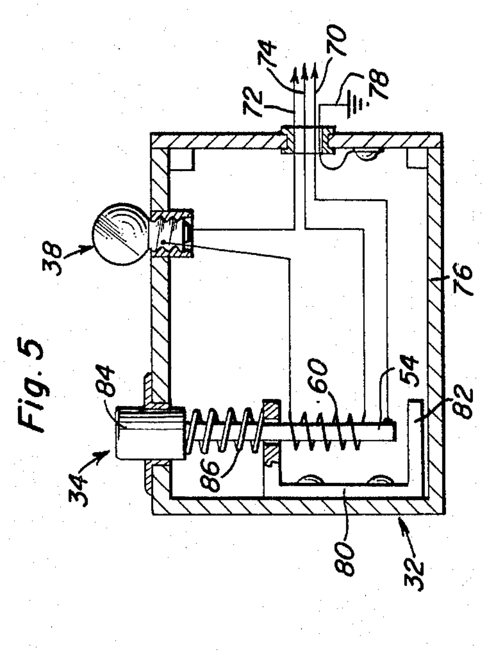
FIGURE 5 is a sectional view through one of the bidding stations from which a purchaser may enter a bid.

Referring now to FIGURE 5 in particular, it will be observed that each bidding station 32 includes an enclosure 76 which may be grounded by the line 78. Mounted internally of the enclosure, is a conductive slide bracket member 80 having a portion 82 forming a fixed switch grounding contact adapted to be engaged by the lower movable switch contact portion 54 of the signal emitting device 34. Accordingly, the line 70 is electrically connected to the movable switch portion 54. The signal emitting device 34 therefore includes a push button 84 adapted to be engaged by a restoring spring 86 biasing the push button 84 upwardly to an extended position wherein the grounding switch 54 is opened. Upon depression of the push button 84 against the bias of the restoring spring 86, the grounding switch 54 will be closed so as to ground the line 70 thereby operative to effect switching of the multi-vibrator 40 with which it is associated as hereinbefore indicated with respect to FIGURE 4. As a result thereof, current is conducted between the conductors 72 and 74 which are respectively connected to the indicator lamp 38 and the interlock magnetic holding coil 60 connected in series with the lamp 38. The lamp 38 and coil 60 will therefore be simultaneously energized, the coil 60 being operative to hold the grounding switch 54 in its closed position with the push button 84 thereby held depressed against the bias of the spring 86. Accordingly, the triode 62 of the associated multi-vibrator will be maintained conductive while the triodes 62 of the other multi-vibrators held non-conductive by virtue thereof. This condition of the actuated bidding station will be displayed through the lamp 38 only to the bidder located at its station. Also, the signal produced by switching of the triode 62 to its conductive condition, will register the bid through the control station 20. It will therefore be apparent, that the first bidder to actuate the signal emitting device 34 will be the only bidder capable of responding to the auctioneer without being identified to the auctioneer or the other bidders and the bid recorded and displayed. The adding machine 22 will then be in condition to receive the next bid and until such next bid is received from some other bidding station, the lamp 38 at the previous bidding station will remain lit and the push button 84 retracted.

Figure 6:
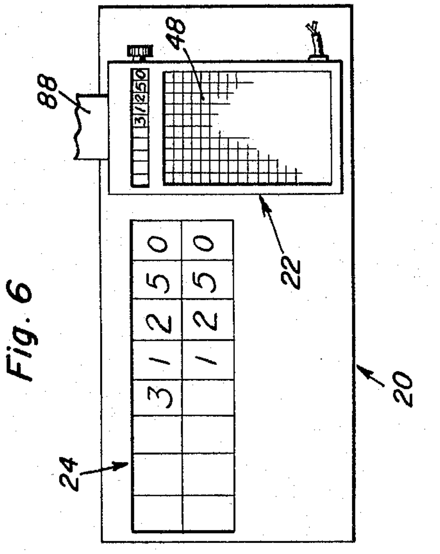
FIGURE 6 is a top plan view of the control station at which the auctioneer exercises control over the bidding.

Referring now to FIGURE 6 in particular, it will be observed that the control station 20 mounts both the adding machine 22 and the display board 24 furnishing the auctioneer with the same information furnished to the bidders by the display board 26. The adding machine 22 may be of a standard type having a keyboard 48 adapted to be actuated by the auctioneer or his clerk so as to select the incremental amount by which the bids are to be increased. Thus, depression of one of the keys on the keyboard 48 will be operative to display the corresponding incremental amount on the lower rows of the display boards 24 and 26 and upon receipt of a bidding signal from one of the bidding stations 32 as one of the amounts totaled by the adding machine. The current or partial total is then displayed on the upper rows of the display boards 24 and 26. When the final bid is in, actuation of the clearing control of the adding machine will be operative to both record the total on the tape 88 as well as the code number associated with the bidding station from which the last bidding signal was received. The signal identifying device 44 is therefore connected to the adding machine 22 for such purpose. The adding machine may then be reset to its initial operative condition simultaneously with resetting of the multi-vibrators to their initial stable condition through the reset device 52 as hereinbefore mentioned.

From the foregoing description, the operation and utility of the system of the present invention will be apparent. It will therefore be appreciated, that noise and confusion is eliminated in connection with auctions by virtue of the visual display of the bidding information and the silent yet reliable nature in which bidders respond to the auctioneer without requiring any recognition of a bidder by the auctioneer for such purpose. The bids so received and recorded are furthermore accomplished without identification of the bidder to either the other bidders or to the auctioneer until the final bid is recorded. Unfair bidding practices are thereby eliminated so that qualified and experienced purchasers may rely solely on quality and condition evaluation of the item being sold in connection with their bidding. Furthermore, because of the manner in which the bidding is accomplished, recognized and the information displayed, the auctioning procedure may be conducted with dignity and fairness to all concerned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A system for bidding at auctions or the like comprising, a plurality of signal emitting devices normally effective during periods of indefinite duration to establish bids by dispatch of signals from a plurality of bidding stations incremental summation means operatively connected to said signal emitting devices for maintaining a cumulative count of said signals transmitted thereto, interlock means operatively connected to each of said signal emitting devices for holding each signal emitting device inoperative following dispatch of a signal therefrom, means responsive to transmission of a signal from one of said signal emitting devices for releasing the interlock means holding another of said signal emitting devices inoperative and transmission disabling means responsive to dispatch of a signal from said one of the signal emitting devices for temporarily preventing transmission of signals from all of the other signal emitting devices until the signal is received by said summation means.

2. The combination of claim 1, including bid indicating means operatively connected to each of said signal emitting devices and said interlock means at the bidding stations for indicating the signal emitting device from which each transmitted signal is originating.

3. The combination of claim 2, including signal identifying means operatively connected to said interlock means to identify the signal emitting device from which each transmitted signal originates.

4. The combination of claim 3, including selectively operated reset means operatively connected to the interlock means and the incremental summation means for rendering all of the signal emitting devices operative and restoring the summation means to an initially operative condition.

5. The combination of claim 4 wherein said transmission disabling means comprises a plurality of multi-vibrators, each multi-vibrator having; a pair of current conducting devices, switching means operatively connecting one of said current conducting devices to one of said signal emitting devices to render the other of said current conductive devices conductive, said one current conducting device being connected to the incremental summation means and operative to produce a pulse therein when rendered non-conductive by the switching means, said other of the current conducting devices being operatively connected to the signal identifying means for producing a pulse therein when rendered conductive by the switching means.

6. The combination of claim 5, wherein said interlock means comprises, magnetic holding means operatively connected to said other current conducting device in one of the multivibrators energized in response to conduction of current therethrough to hold one of said signal emitting devices in a condition for maintaining said other current conducting device conductive.

7. The combination of claim 6, wherein each of said signal emitting devices comprises, a push button, a grounding switch connected to said push button adapted to establish a switching signal for said signal dispatch responsive means, and biasing means engageable with said push button for biasing thereof to an extended position opening the grounding switch, said interlock means being operative to hold the push button retracted and said grounding switch closed.

8. The combination of claim 7, wherein said bid indicating means comprising a lamp device mounted adjacent each signal emitting device and connected in series with said interlock means to said transmission disabling means.

9. The combination of claim 8, wherein said incremental summation means comprises; an adding device having a selectively actuated keyboard through which an incremental amount is selected, recording means for registering each amount in response to receipt of a signal from one of said signal emitting devices and selectively actuated clearing means operatively connected to the signal identifying means and the recording means for registering the final total of incremental amounts and identifying the origin of the final signal.

10. The combination of claim 9, including display means operatively connected to the adding device and visible from said bidding stations for indicating the incremental amount associated with each signal and the partial total associated therewith.

11. The combination of claim 1, including signal identifying means operatively connected to said transmission disabling means to identify the signal emitting device from which each signal originates.

12. The combination of claim 11, wherein said incremental summation means comprises; an adding device having a selectively actuated keyboard through which an incremental amount is selected, recording means for registering each amount in response to receipt of a signal from one of said signal emitting devices and selectively actuated clearing means operatively connected to the signal identifying means and the recording means for registering the final total of incremental amounts and identifying the origin of the final signal.

13. The combination of claim 12, including display means operatively connected to the adding device and visible from said bidding stations for indicating the incremental amount associated with each signal and the partial total associated therewith.

14. The combination of claim 1 wherein said transmission disabling means comprises a plurality of multivibrators, each multi-vibrator having; a pair of current conducting devices, switching means operatively connecting one of said current conducting devices to one of said signal emitting devices to render the other of said current conduction devices conductive, said one current conducting device being connected to the incremental summation means and operative to produce a pulse therein when rendered non-conductive by the switching means, said other of the current conducting devices being operatively connected to the signal identifying means for producing a pulse therein when rendered conductive by the switching means.

15. The combination of claim 14, wherein said interlock means comprises, magnetic holding means operatively connected to said other current conducting device in one of the multivibrators energized in response to conduction of current therethrough to hold one of said signal emitting devices in a condition for maintaining said other current conducting device conductive.

16. The combination of claim 1, wherein each of said signal emitting devices comprises, a push button, a grounding switch connected to said push button adapted to establish a switching signal for said signal dispatch responsive means, and biasing means engageable with said push button for biasing thereof to an extended position opening the grounding switch, said interlock means being operative to hold the push button retracted and said grounding switch closed.

17. The combination of claim 1, wherein said bid indicating means comprising a lamp device mounted adjacent each signal emitting device and connected in series with said interlock means to said transmission disabling means.

18. The combination of claim 1, including selectively operated reset means operatively connected to the transmission disabling means and the incremental summation means for rendering all of the signal emitting devices operative and restoring the summation means to an initially operative condition.

19. In an auction conducting system, a control display station having a receiver, a plurality of normally operative signal emitters, a signal transmitting circuit independently connecting said signal emitters to the central display station for transmission of bidding signals to the receiver, means controlled from said central display station to simultaneously condition for operation all but one of the signal emitters from which a preceding bidding signal originated, means for preventing successive operation of said one of the signal emitters during a period terminated by receipt of a bidding signal from another of the operatively conditioned signal emitters, and means at the central display station for identifying the signal emitter from which each bidding signal is received by the receiver, whereby one bid at a time may be rapidly received at the central display station from different bidders without revealing their identities.

References Cited by the Examiner

UNITED STATES PATENTS

| | | | |
|---|---|---|---|
| 1,887,684 | 11/1932 | Huizinga | 340—324 |
| 2,266,826 | 12/1941 | Stockfeld | 340—147 |
| 2,350,146 | 5/1944 | Borgeson | 340—147 |
| 2,398,677 | 4/1946 | Stockfeld | 340—147 |
| 2,731,622 | 1/1956 | Doremus et al. | 340—147 |
| 2,775,752 | 12/1956 | Hoberman | 340—147 |
| 2,922,084 | 1/1960 | Franz | 340—147 |
| 3,025,498 | 3/1962 | Boldgett | 340—147 |

NEIL C. READ, *Primary Examiner.*

H. I. PITTS, *Assistant Examiner.*